(12) United States Patent
Banipal et al.

(10) Patent No.: US 11,514,507 B2
(45) Date of Patent: Nov. 29, 2022

(54) VIRTUAL IMAGE PREDICTION AND GENERATION

(71) Applicant: INTERNATIONAL BUSINESS MACHINES CORPORATION, Armonk, NY (US)

(72) Inventors: Indervir Singh Banipal, Austin, TX (US); Shikhar Kwatra, Durham, NC (US); Zachary A. Silverstein, Austin, TX (US); Tiberiu Suto, Franklin, NY (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 16/807,293

(22) Filed: Mar. 3, 2020

(65) Prior Publication Data

US 2021/0279790 A1 Sep. 9, 2021

(51) Int. Cl.
*G06Q 30/00* (2012.01)
*G06Q 30/06* (2012.01)
*G06Q 10/08* (2012.01)
*G06Q 30/02* (2012.01)
*H04L 67/306* (2022.01)
(Continued)

(52) U.S. Cl.
CPC ......... *G06Q 30/0643* (2013.01); *G06N 20/00* (2019.01); *G06Q 10/087* (2013.01); *G06Q 30/0185* (2013.01); *G06Q 30/0282* (2013.01); *G06T 11/00* (2013.01); *H04L 67/306* (2013.01)

(58) Field of Classification Search
CPC ......... G06N 20/00; G06Q 30/02; G06T 11/00
See application file for complete search history.

(56) References Cited

U.S. PATENT DOCUMENTS 6,963,848 B1 11/2005 Brinkerhoff
8,554,701 B1 10/2013 Dillard
(Continued)

FOREIGN PATENT DOCUMENTS

KR 101920372 B1 11/2018
WO 20161375071 W 9/2016
WO 20192112881 W 11/2019

OTHER PUBLICATIONS

"A Survey of Augmented Reality," Billinghurst et al., Google Patents, 2pgs. (Year: 2015).*
(Continued)

*Primary Examiner* — Robert M Pond
(74) *Attorney, Agent, or Firm* — Schmeiser, Olsen & Watts, LLP; Stephanie Carusillo

(57) ABSTRACT

A method, system, and computer program product for generating a mixed reality simulation is provided. The method includes receiving permission to generate product simulations for a targeted product requested by a user. Current data and historical data associated with the targeted product is received and predicted conditions for the targeted product are generated. Multiple virtual images of the targeted product are generated based on the predicted conditions. The multiple virtual images represent an augmented reality based series of images that predict a progression of physical change over time of the targeted product resulting from exposure to environmental conditions. The multiple virtual images are presented to the user via a virtual user interface of an augmented reality hardware device.

20 Claims, 7 Drawing Sheets

US 11,514,507 B2

Page 2

(51) Int. Cl.
*G06N 20/00* (2019.01)
*G06T 11/00* (2006.01)

(56) References Cited

U.S. PATENT DOCUMENTS

| | | | |
|---|---|---|---|
| 8,650,023 B2 | 2/2014 | Brun | |
| 9,646,078 B2 | 5/2017 | Galitsky | |
| 9,852,238 B2 * | 12/2017 | Forsyth | G06F 30/13 |
| 10,275,408 B1 | 4/2019 | Cohen | |
| 10,579,749 B1 * | 3/2020 | Davis | G06T 19/006 |
| 11,069,145 B1 * | 7/2021 | Pearson | G06T 19/006 |
| 2014/0122045 A1 * | 5/2014 | Mewes | G06F 30/20 |
| | | | 703/6 |
| 2015/0310135 A1 * | 10/2015 | Forsyth | G06F 30/13 |
| | | | 703/1 |

OTHER PUBLICATIONS

Combining augmented reality and simulation-based optimization for decision support in manufacturing, Ingemar et al., Proceedings—Winter Simulation Conference: 3988-3999, Institute of Electrical and Electronics Engineers Inc., Jun. 28, 2017, Dialog #20181404970490, 12pgs. (Year: 2017).*

Mell, Peter et al.; "The NIST Definition of Cloud Computing;" National Institute of Standards and Technology; Special Publication 800-145; Sep. 2011; 7 pages.

* cited by examiner

VIRTUAL IMAGE PREDICTION AND GENERATION

BACKGROUND

The present invention relates generally to a method for generating a mixed reality simulation and in particular to a method and associated system for improving virtual reality technology associated with retrieving data associated with a product and generating and presenting multiple virtual images representing an augmented reality based series of images that predict a progression of physical change over time of the targeted product.

SUMMARY

A first aspect of the invention provides a mixed reality simulation method comprising: receiving, by a processor of an augmented reality hardware device from a user, permission to generate product simulations for a targeted product requested by the user; retrieving, by the processor in response to the receiving the permission, current data describing a current version of the targeted product; retrieving, by the processor in response to the receiving the permission, historical data describing multiple previous versions of the targeted product; generating, by the processor based on the current data and the historical data, predicted conditions for the targeted product; generating, by the processor based on the predicted conditions for the targeted product, multiple virtual images of the targeted product, wherein the multiple virtual images represent an augmented reality based series of images that predict a progression of physical change over time of the targeted product resulting from exposure to environmental conditions; and presenting, by the processor to the user via a virtual user interface of the augmented reality hardware device, the multiple virtual images of the targeted product.

A second aspect of the invention provides a computer program product, comprising a computer readable hardware storage device storing a computer readable program code, the computer readable program code comprising an algorithm that when executed by a processor of an augmented reality hardware device implements a mixed reality simulation method, the method comprising: receiving, by the processor from a user, permission to generate product simulations for a targeted product requested by the user; retrieving, by the processor in response to the receiving the permission, current data describing a current version of the targeted product; retrieving, by the processor in response to the receiving the permission, historical data describing multiple previous versions of the targeted product; generating, by the processor based on the current data and the historical data, predicted conditions for the targeted product; generating, by the processor based on the predicted conditions for the targeted product, multiple virtual images of the targeted product, wherein the multiple virtual images represent an augmented reality based series of images that predict a progression of physical change over time of the targeted product resulting from exposure to environmental conditions; and presenting, by the processor to the user via a virtual user interface of the augmented reality hardware device, the multiple virtual images of the targeted product.

A third aspect of the invention provides an augmented reality hardware device comprising a processor coupled to a computer-readable memory unit, the memory unit comprising instructions that when executed by the processor implements an augmented reality method comprising: receiving, by the processor from a user, permission to generate product simulations for a targeted product requested by the user; retrieving, by the processor in response to the receiving the permission, current data describing a current version of the targeted product; retrieving, by the processor in response to the receiving the permission, historical data describing multiple previous versions of the targeted product; generating, by the processor based on the current data and the historical data, predicted conditions for the targeted product; generating, by the processor based on the predicted conditions for the targeted product, multiple virtual images of the targeted product, wherein the multiple virtual images represent an augmented reality based series of images that predict a progression of physical change over time of the targeted product resulting from exposure to environmental conditions; and presenting, by the processor to the user via a virtual user interface of the augmented reality hardware device, the multiple virtual images of the targeted product.

The present invention advantageously provides a simple method and associated system capable of accurately generating a mixed reality simulation.

DETAILED DESCRIPTION

Figure 1:
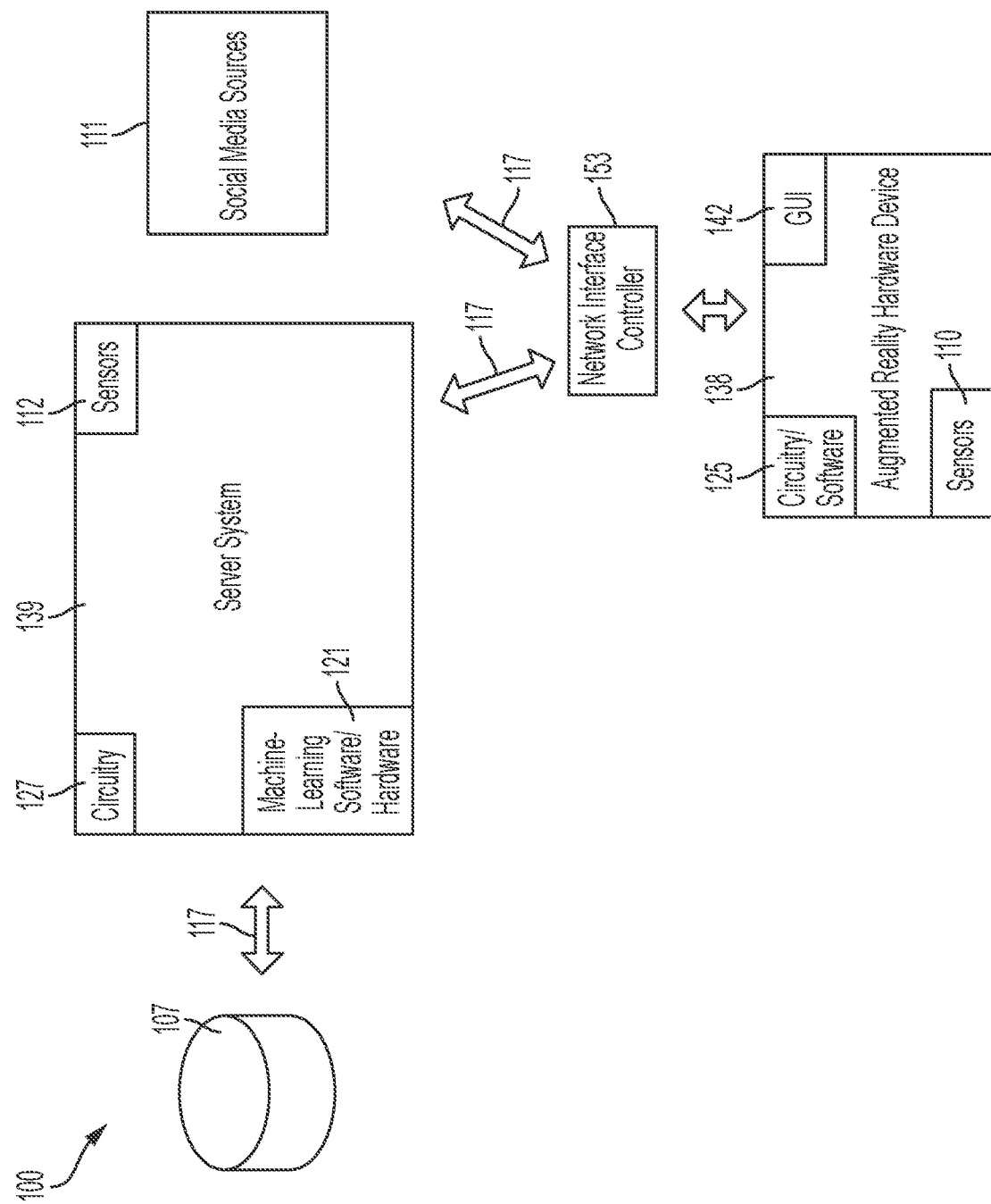
FIG. 1 illustrates a system for improving virtual reality technology associated with retrieving data associated with a product and generating and presenting multiple virtual images representing an augmented reality based series of images that predict a progression of physical change over time of the targeted product, in accordance with embodiments of the present invention.

FIG. 1 illustrates a system 100 for improving virtual reality technology associated with retrieving data associated with a product and generating and presenting multiple virtual images representing an augmented reality based series of images that predict a progression of physical change over time of the targeted product, in accordance with embodiments of the present invention. Users attempting to locate various items typically rely on reviews to assist with purchasing decisions. However, entities providing item reviews may not have experienced usage of an item with respect to a similar item condition (as a prospective buyer) and therefore the reviewing entities experience may not match a buyer's predicted experience. Therefore, system 100 enables a process for visualizing an item and associated functionality after various timeframes (e.g., 1 month, 2 months, 3 months, etc.) with respect to an anticipated usage pattern of a buyer.

System 100 is configured to enable and incentivize reviewers to digitally include additional details to associated reviews over time via implementation of Internet of Things (IOT) sensors and augmented reality (AR) or virtual reality (VR) technologies to determine changes in product and associated performance over time with respect to specific operational/usage conditions. Therefore, when a prospective buyer considers purchasing a particular item, system 100 will automatically extract (from a review data pool database) reviews matching the prospective buyer's usage conditions. Subsequently, virtual images (of the particular item) are presented to the buyer via AR or VR technology. The virtual images comprise predicted images for presenting predictions describing how the item would be expected to present and/or operate over time with respect to expected usage conditions.

System 100 enables a process for computing a continued compatibility of a product with respect to a user's personalized usage of the product. Additionally, system 100 is configured for demonstrating a variance of product compatibility over time within an AR/VR scenario.

System 100 is configured to generate a mixed reality (MR) image representing an overall product (e.g., a device) and its variation with respect to a time series progression. Additionally, system 100 is enabled to generate an MR image(s) to visualize specific sub-components (of the product) and an associated variation over time with respect to the time series progression. System 100 provides the ability to generate a profile for users providing review/feedback with respect to a product and its associated sub-components. The profile may be used for ranking or scoring a credibility of the user(s). Likewise, more weight may be given to variations and visualizations suggested to the user(s) associated with a higher credibility score.

System 100 is configured to generate inflection points for a same product and associated sub-components with respect to differing brands for providing a summary to an end-user. For example, a first product comprising an initial rating of 4.5 may degrade (e.g., with respect to presentation or operation) to a rating of 2.5 within a year and a second product may comprise an initial rating of 4.0 but may only degrade to a rating of 3.0 for a next couple of years. Therefore, a resulting inflection point is equal to a rating of 2.5 where the first and second products will meet within one year resulting in the second product having a better rating than the first product.

System 100 of FIG. 1 includes a server system 139 (i.e., specialized hardware device), an augmented reality hardware device 138, a network interface controller 153, social media sources 111, and a database 107 (e.g., a cloud-based system) interconnected through a network 117. Server system 139 includes specialized circuitry 127 (that may include specialized software), sensors 112, and machine learning software code/hardware structure 121 (i.e., including machine learning software code). Interface controller 153 may include any type of device or apparatus for securely interfacing hardware and software to a network. Augmented reality hardware device 138 may include, inter alia, dedicated hardware, smart glass, a hologram generation apparatus etc. Augmented reality hardware device 138 may be Bluetooth enabled to provide connectivity to each other and any type of system. Augmented reality hardware device 138 includes specialized circuitry 125 (that may include specialized software/service), sensors 110, and a GUI 142. Sensors 110 and 112 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Social media sources 111 may comprise any type of social media Websites and/or Internet Websites. Server system 139 and augmented reality hardware device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server system 139 and augmented reality hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving virtual reality technology associated with retrieving data associated with a product and generating and presenting multiple virtual images representing an augmented reality based series of images that predict a progression of physical change over time of the targeted product. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables a process for generating a visualization of a product and an associated physical variation over time as a series of images predicting a progression of physical change resulting from exposure to an environment. The process may include:
1. Determining a current state of an object.
2. Determining an environment associated with a location that the object will be deployed in for a specified period of time.
3. Generating a series of images that are configured to predict changes to the object based on an exposure to the environment for the specified period of time.

System 100 may additionally execute analytics software to predict a performance or quality of experience of the object and its associated sub-components individually over time. Likewise, a profile may be generated for users generating review/feedback for a product and its associated sub-components. The profile may be used for ranking or scoring a credibility of the user such that more weight is applied to variations and visualizations suggested to users associated with a higher credibility score.

The following process describes an implementation example associated with an automobile (i.e., a product). The automobile (when originally purchased) may initially comprise a glossy paint finish. However, the paint finish may become dull over time when subjected to a high temperature environment (e.g., a desert). Likewise, an automobile (e.g., metal panels of the automobile) subjected to winter locations associated with salt or calcium chloride on the roads (for snow melt) may start to rust or corrode after 10 years, etc. Therefore, system 100 enables IOT sensors and a user's AR/VR devices to capture the degradation (e.g., of the paint finish or metal panels) via physical sensors and imagery of the automobile. Associated IOT logs may be remitted to a cloud module so that when a user wishes to view how a product may present, they may view the specific images generated.

Figure 2:
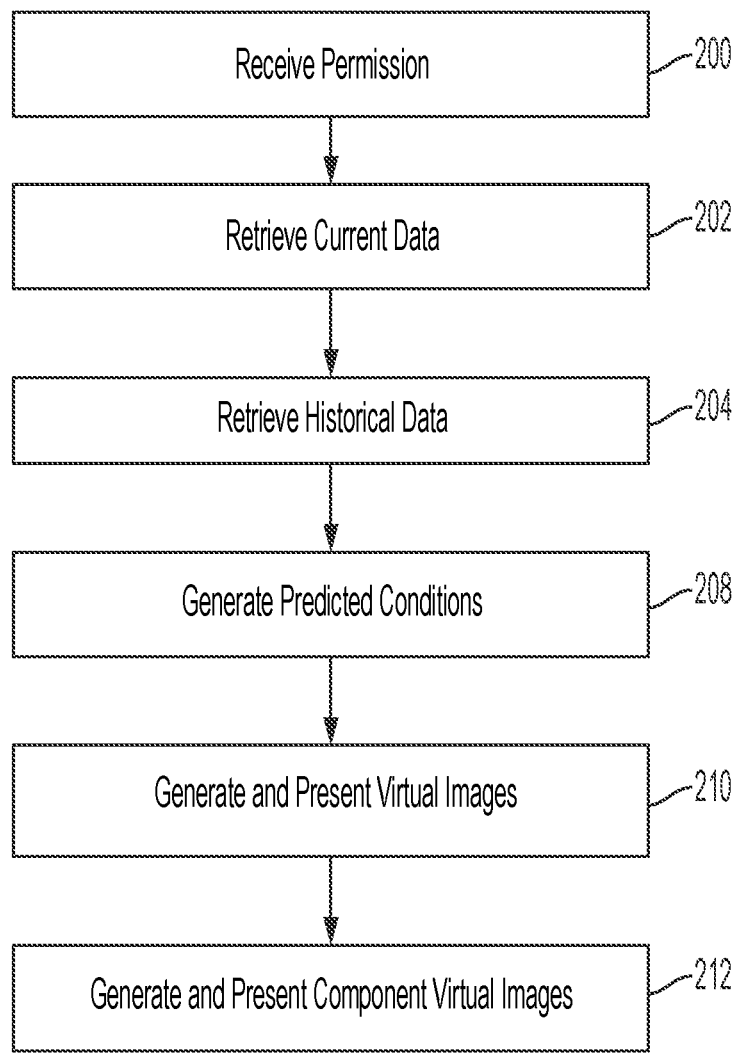
FIG. 2 illustrates an algorithm detailing a process flow enabled by the system of FIG. 1 for improving virtual reality technology associated with retrieving data associated with a product and generating and presenting multiple virtual images representing an augmented reality based series of images that predict a progression of physical change over time of the targeted product, in accordance with embodiments of the present invention.

FIG. 2 illustrates an algorithm detailing a process flow enabled by system 100 of FIG. 1 for improving virtual reality technology associated with retrieving data associated with a product and generating and presenting multiple virtual images representing an augmented reality based series of images that predict a progression of physical change over time of the targeted product, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server system 139 and augmented reality hardware device 138. In step 200, permission to generate product simulations for a targeted product requested is received (by an augmented reality hardware device) from a user. In step 202 (in response to said receiving the permission) current data describing a current version of the targeted product is received. The current data may include feedback (with respect to the targeted product) from the user. The feedback may include, inter alia, manual ratings for the targeted product, text reviews for the targeted product, edited animations for the targeted product, etc. The feedback may be converted (via execution of a tone analyzer apparatus) into a plurality of numbers representing the feedback.

In step 204, historical data describing multiple previous versions of the targeted product is received. In step 208, predicted conditions for the targeted product are generated based on the current data and historical data, generating the predicted conditions may include:

1. Generating and analyzing a profile of users providing review and feedback with respect to the targeted product and associated sub-components.
2. Ranking (based on results of the analysis) a credibility of the users.

In step 210, multiple virtual images of the targeted product are generated and presented (to the user via a virtual user interface of the augmented reality hardware device) based on the predicted conditions. The multiple virtual images represent an augmented reality based series of images that predict a progression of physical change over time of the targeted product resulting from exposure to environmental conditions. Generating the multiple virtual images may include:

1. Determining (based on analysis of the current data) a current state of the targeted product.
2. Determining (based on user input) an environment that the targeted product will be deployed in for a specified period of time.
3. Generating a prediction associated with changes for the targeted product in response to exposure to the environment for the period of time.

Additionally, (in step 210) inflection points for the targeted product and associated sub-components may be generated with respect to differing manufacturers of the targeted product. Subsequently, a digital simulation (of the targeted product with respect to personalized usage and time metrics) and associated summary (for user product selection) may be generated based on the inflection points. The multiple virtual images of the targeted product may be generated based on the digital simulation of the targeted product.

In step 212, predicted conditions for specified components of the targeted product are generated based on the current data and historical data. Additionally, multiple virtual images of the specified components are generated and presented (to the user via a virtual user interface of the augmented reality hardware device) based on the predicted conditions. The multiple virtual images of the specified components represent an augmented reality based series of images that predict a progression of physical change over time of said of the specified components resulting from exposure to the environmental conditions.

Figure 3:
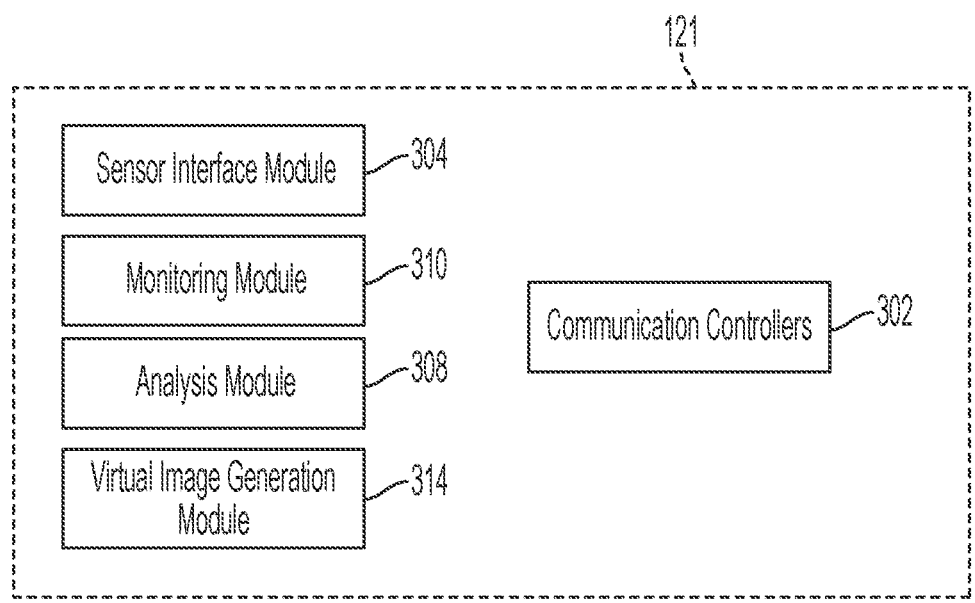
FIG. 3 illustrates an internal structural view of the machine learning software/hardware structure and/or the circuitry/software of FIG. 1, in accordance with embodiments of the present invention.

FIG. 3 illustrates an internal structural view of machine learning software/hardware structure 121 (and/or circuitry/software 125) of FIG. 1, in accordance with embodiments of the present invention. Machine learning software/hardware structure 121 includes a sensor interface module 304, a monitoring module 310, an analysis module 308, a virtual image generation module 314, and communication controllers 302. Sensor interface module 304 comprises specialized hardware and software for controlling all functions related to sensors 110 or 112 of FIG. 1. Monitoring module 310 comprises specialized hardware and software for controlling all functionality related control of all monitoring functionality for implementing the process described with respect to the algorithm of FIG. 2. Analysis 308 comprises specialized hardware and software for controlling all functions related to the analysis steps of FIG. 2. Virtual image generation module 314 comprises specialized hardware and software for controlling all functions related to generating multiple virtual images as described, supra. Communication controllers 302 are enabled for controlling all communications between sensor interface module 304, monitoring module 310, analysis module 308, and virtual image generation module 314.

Figure 4:
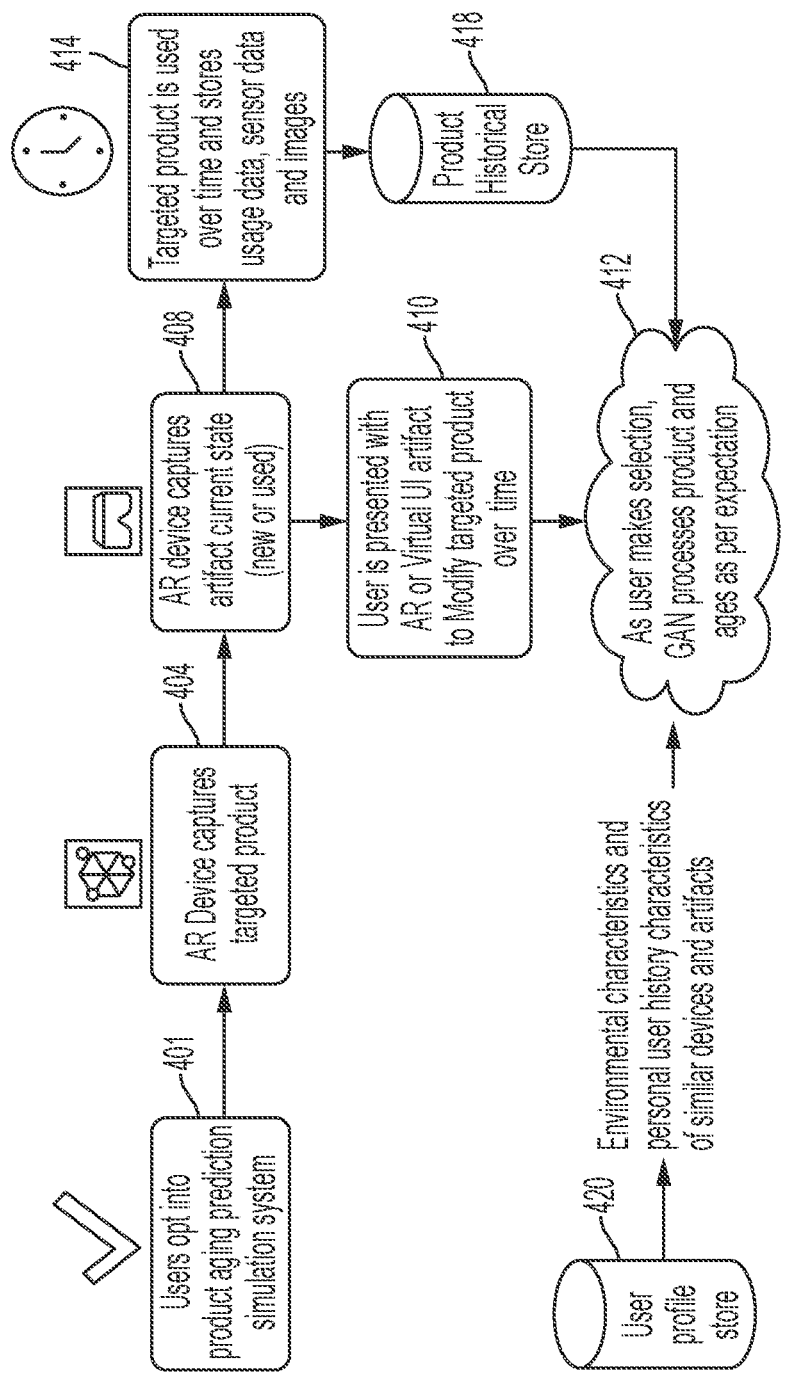
FIG. 4 illustrates an algorithm detailing a process flow enabled by the system of FIG. 1 for implementing a specified virtual image generation embodiment, in accordance with embodiments of the present invention.

FIG. 4 illustrates an algorithm detailing a process flow enabled by system 100 of FIG. 1 for implementing a specified virtual image generation embodiment, in accordance with embodiments of the present invention. In step 401, users opt into (via user permissions) a product aging prediction system. The system is implemented via an augmented reality (AR) device. In step 404, the AR device (e.g., an AR/VR headsets) visually captures a targeted product. The AR device is required for users to visualize a visual animation of the targeted product. In step 408, the AR device captures a current (condition or operational) state of the targeted product. In step 410, a user is presented with an AR or virtual user interface to modify a virtual image of the targeted product over time. The user may provide feedback with respect to the targeted product using a VR editor. The feedback may include rating such as, inter alia, manual ratings in the form of numbers (e.g., 4.5, 5.0, etc.), text reviews, edits of animations for visualization, etc. A tone analyzer may be configured to generate reviews in the form of numbers from text analysis. Likewise, a principle component analysis (PCA) process may be executed for reducing a number of dimensions (from an output of tone analyzer such as happy, sadness, frustration, etc.) to a single dimension (e.g., positive and negative) and scale down to 0-5. Existing visualizations may be calibrated with respect to the scale down for generating a rating associated with a highest confidence. In step 414, the targeted product is used over time and associated usage data, sensor data, and images are stored. Additionally, an averaged version of the rating is plotted (on a graph) with respect to time to identify a user's progression of a personalized experience associated with usage of the targeted product. Multiple generated graphs may be averaged to illustrate a progression of product performance (of the targeted product) throughout the timeframe. Weighted averages (having a coefficient dependent on a credibility score of the user) may be used to generate the graphs. The credibility score may be generated and increased or decreased depending on the following various factors:

1. An amount of experience with the targeted product or similar types of products.
2. Interactions with repair centers for the targeted product.
3. An agreement or similar sentiment expressed by additional experienced users.

In step 418, linear/logistical regression code is executed to predict a future progression of the product. Associated analytics are generated and presented to users and the associated analytics are stored in a product history store.

In step 412, a generative adversarial network (GAN) visually ages or modifies an artifact (i.e., a VR image of the targeted product) as per a known user usage pattern retrieved from a stored user history database and a user profile store 420. The GAN utilizes the usage pattern to generate potential operational usage scenarios. The operational usage scenario is generated based on possibilities within a digital twin framework. A discriminator component within the GAN evaluates an authenticity of the digital twin operational framework usage created by the GAN to forecast if the operational usage is consistent with personalized operation of the digital twin framework implemented process for a given individual(s). The discriminator component additionally receives the generated digital twin operational usage scenario created by the GAN. Additionally, the discriminator component receives operational digital twin operations usage scenarios from the following sources:

1. A personalized operational usage ground truth dataset associated with a physical device, a process, or digital twin operational usage.
2. A related operational usage ground truth dataset associated with operational usage from a same personalization group for a similar physical device, process, or digital twin operational usage.
3. An aggregate operational usage ground truth dataset associated with common aggregate operational usage scenarios that are performed by most personalization groups.

The discriminator component may be configured to assign a digital label to each received operational usage scenario to forecast if the discriminator component represents a real or invented personalized operational usage for the digital twin. A resulting feedback loop is used as an input to a next digital twin operational generator. If the next digital twin operational generator generates a usage scenario that the discriminator component labels as consistent with the personalization group, then the next digital twin operational generator is configured to explore related operational usage scenarios in this area. If a usage scenario is not generated, the discriminator component is configured to adjust accordingly to already determined personalization traits. Each generated operational usage scenario labeled as consistent with the personalization group is collected into a usage scenario collection corpus. The aforementioned process may illustrate how long a given product is expected to remain in adequate condition.

Figure 5:
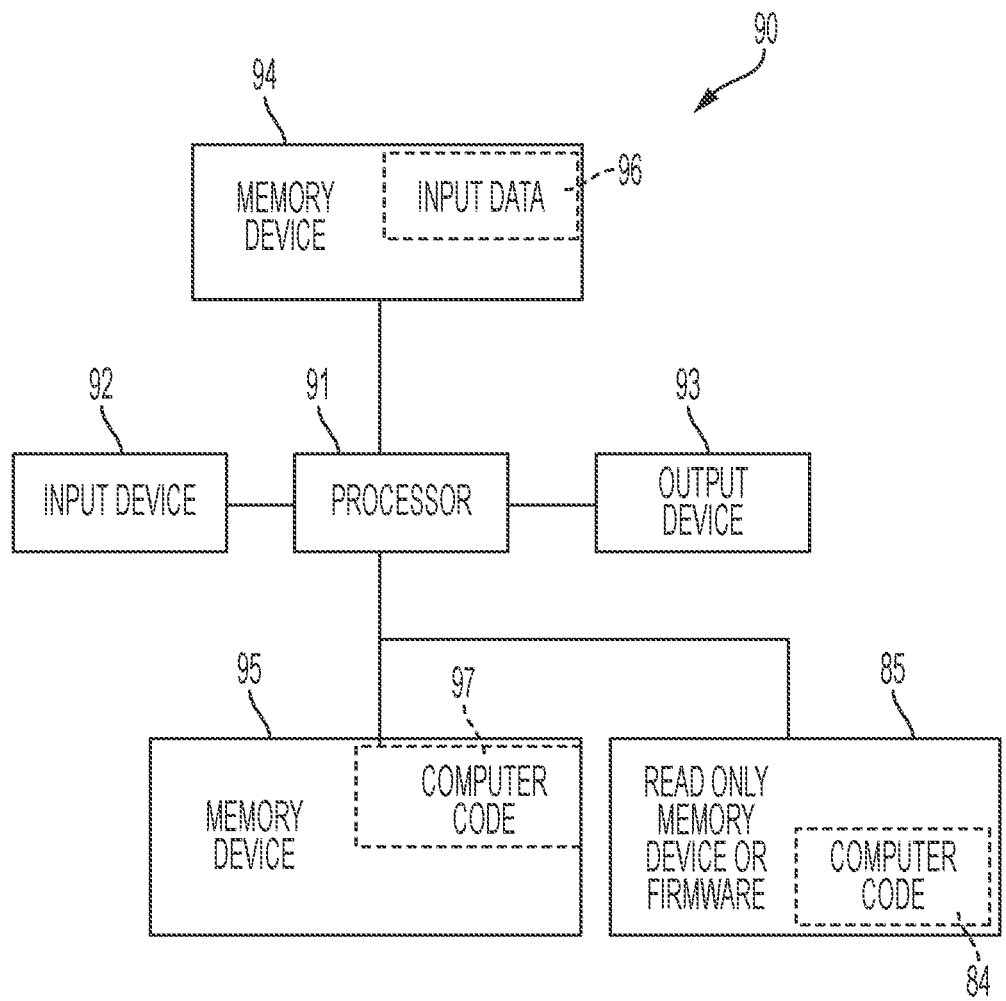
FIG. 5 illustrates a computer system used by the system of FIG. 1 for improving virtual reality technology associated with retrieving data associated with a product and generating and presenting multiple virtual images representing an augmented reality based series of images that predict a progression of physical change over time of the targeted product, in accordance with embodiments of the present invention.

FIG. 5 illustrates a computer system 90 (e.g., augmented reality hardware device 138 and/or server system 139 of FIG. 1) used by or comprised by the system of FIG. 1 for improving virtual reality technology associated with retrieving data associated with a product and generating and presenting multiple virtual images representing an augmented reality based series of images that predict a progression of physical change over time of the targeted product, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving virtual reality technology associated with retrieving data associated with a product and generating and presenting multiple virtual images representing an augmented reality based series of images that predict a progression of physical change over time of the targeted product. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve virtual reality technology associated with retrieving data associated with a product and generating and presenting multiple virtual images representing an augmented reality based series of images that predict a progression of physical change over time of the targeted product. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving virtual reality technology associated with retrieving data associated with a product and generating and presenting multiple virtual images representing an augmented reality based series of images that predict a progression of physical change over time of the targeted product. In another embodiment, the invention provides a business method that performs the process steps of the invention on a subscription, advertising, and/or fee basis. That is, a service supplier, such as a Solution Integrator, could offer to enable a process for improving virtual reality technology associated with retrieving data associated with a product and generating and presenting multiple virtual images representing an augmented reality based series of images that predict a progression of physical change over time of the targeted product. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
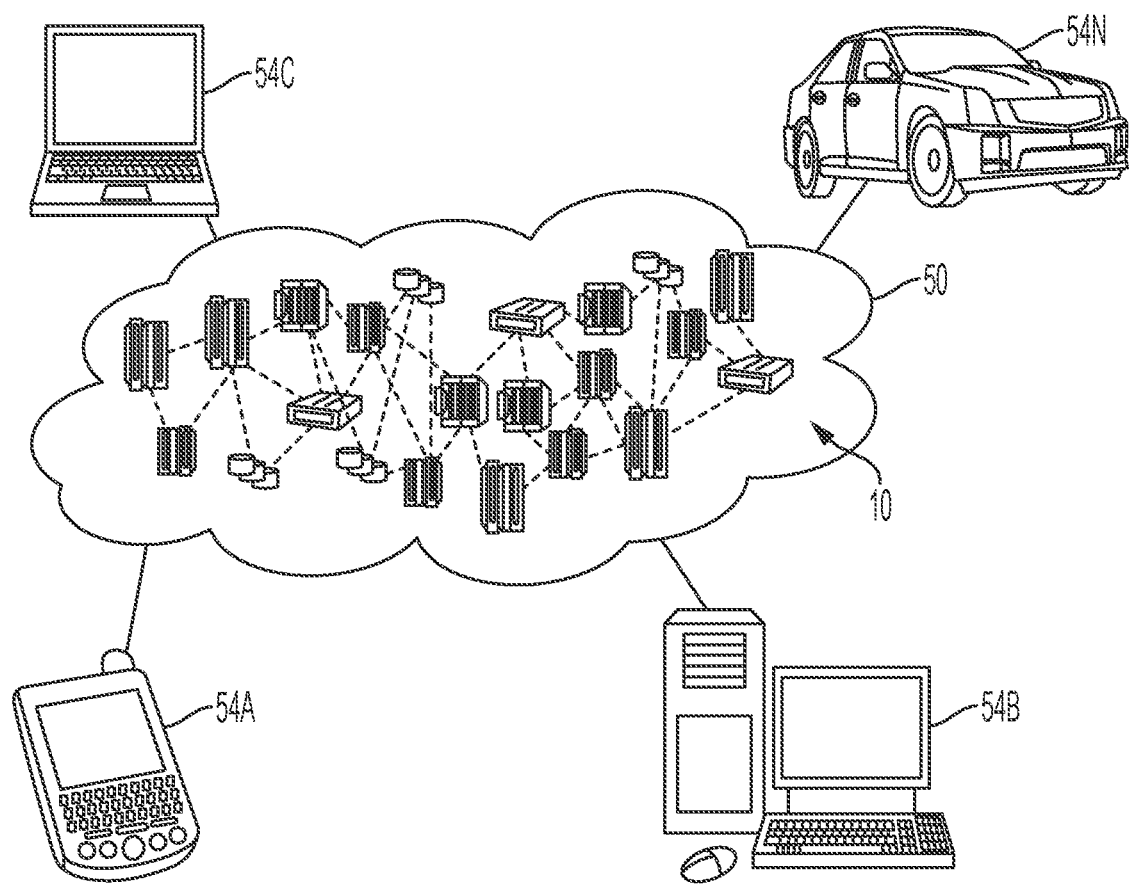
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
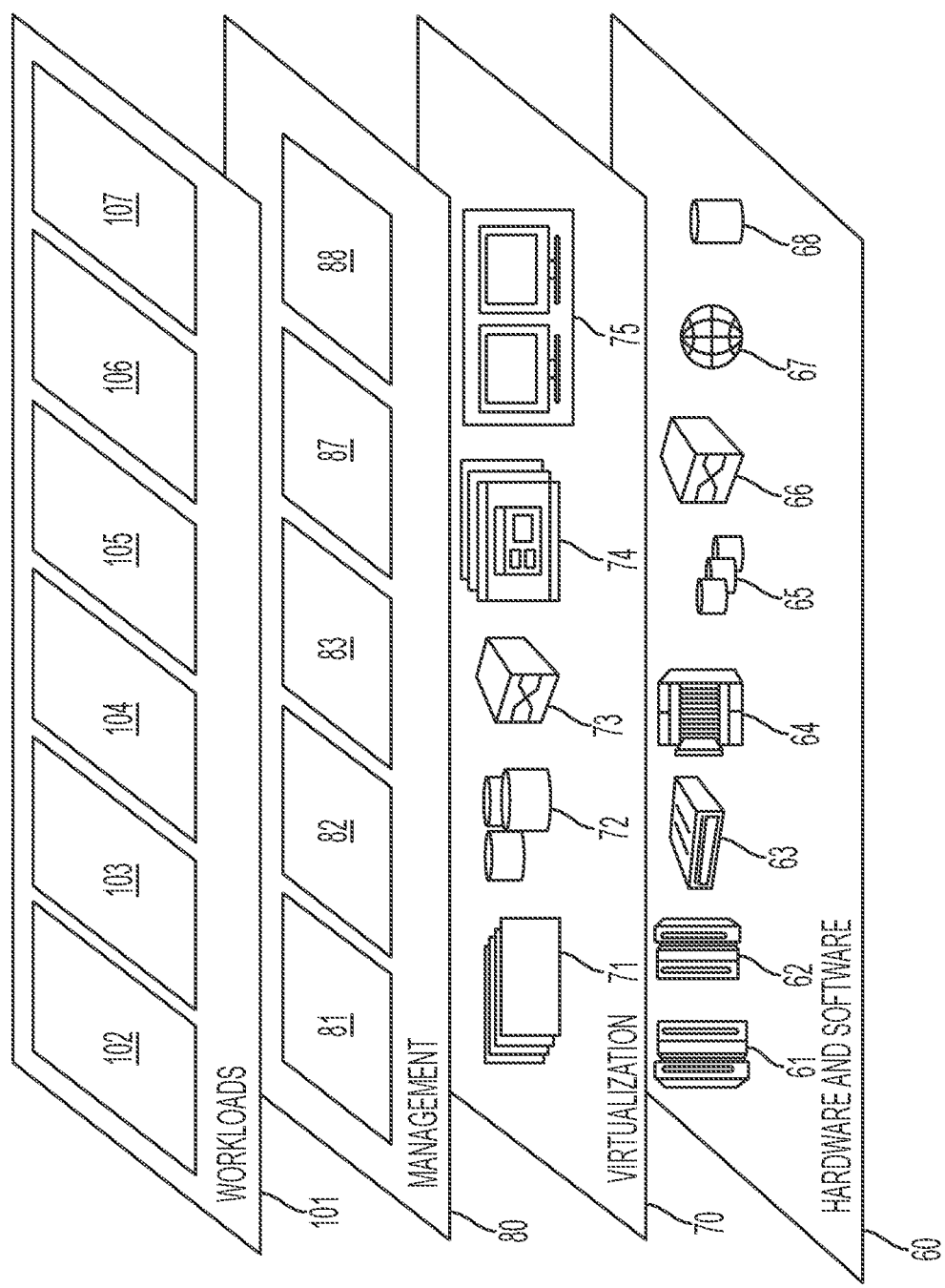
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving network security technology associated with monitoring network usage, ranking and modifying user security questions associated with enabling access to a secure account of a user; and retrieving data associated with a product and generating and presenting multiple virtual images representing an augmented reality based series of images that predict a progression of physical change over time of the targeted product 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A mixed reality simulation method comprising:
  receiving, by a processor of an augmented reality hardware device from a user, permission to generate product simulations for a targeted product requested by said user;
  retrieving via physical sensors and a video retrieval device, by said processor in response to said receiving said permission, current data describing a current version of said targeted product;
  retrieving, by said processor in response to said receiving said permission, historical data describing multiple previous versions of said targeted product;
  generating, by said processor based on said current data and said historical data, predicted conditions for said targeted product;
  generating, by said processor based on said predicted conditions for said targeted product, multiple virtual images of a visually aged and modified version of said targeted product, wherein said multiple virtual images represent an augmented reality based series of images that predict a progression of physical change and an operational functionality and performance condition change over time of said targeted product resulting from a usage pattern of the user and exposure to environmental conditions; and
  presenting, by said processor to said user via a virtual user interface of said augmented reality hardware device, a visual animation comprising said multiple virtual images of said targeted product.

2. The method of claim 1, wherein generating said multiple virtual images of said targeted product comprises:
  determining, based on analysis of said current data, a current state of said targeted product;
  determining, based on user input, an environment that said targeted product will be deployed in for a specified period of time; and
  generating a prediction associated with changes for said targeted product in response to exposure to said environment for said period of time.

3. The method of claim 1, further comprising:
  generating, by said processor based on said current data and said historical data, predicted conditions for specified components of said targeted product;

generating, by said processor based on said predicted conditions for specified components, multiple virtual images of said specified components, wherein said multiple virtual images of said specified components represent an augmented reality based series of images that predict a progression of physical change over time of said of said specified components resulting from exposure to said environmental conditions; and presenting, by said processor to said user via said virtual user interface of said augmented reality hardware device, said multiple virtual images of said specified components.

4. The method of claim 1, wherein said generating said predicted conditions for said targeted product comprises:

generating, a profile of users providing review and feedback with respect to said targeted product and associated sub-components;

analyzing, said profile; and ranking based on results of said analyzing said profile, a credibility of said users.

5. The method of claim 1, further comprising:

generating, by said processor, inflection points for said targeted product and associated sub-components with respect to differing manufacturers of said targeted product; and generating, by said processor based on results of said generating said inflection points, a digital simulation of said targeted product with respect to personalized usage and time metrics; and generating, by said processor based on said digital simulation, a summary for said user for product selection, wherein said multiple virtual images of said targeted product are generated based on said digital simulation of said targeted product.

6. The method of claim 1, wherein said current data comprises feedback, from said user, with respect to said targeted product.

7. The method of claim 6, wherein said feedback comprises feedback data selected from the group consisting of manual ratings for said targeted product, text reviews for said targeted product, and edited animations for said targeted product.

8. The method of claim 6, further comprising:

converting, by said processor executing a tone analyzer apparatus, said feedback into a plurality of numbers representing said feedback.

9. The method of claim 1, further comprising:

providing at least one support service for at least one of creating, integrating, hosting, maintaining, and deploying computer-readable code in the control hardware, said code being executed by the computer processor to implement: said receiving, said retrieving said current data, said retrieving said historical data, said generating said predicted conditions, said generating said multiple virtual images, and said presenting.

10. A computer program product, comprising a computer readable hardware storage device storing a computer readable program code, said computer readable program code comprising an algorithm that when executed by a processor of an augmented reality hardware device implements a mixed reality simulation method, said method comprising:

receiving, by said processor from a user, permission to generate product simulations for a targeted product requested by said user;

retrieving via physical sensors and a video retrieval device, by said processor in response to said receiving said permission, current data describing a current version of said targeted product;

retrieving, by said processor in response to said receiving said permission, historical data describing multiple previous versions of said targeted product;

generating, by said processor based on said current data and said historical data, predicted conditions for said targeted product;

generating, by said processor based on said predicted conditions for said targeted product, multiple virtual images of a visually aged and modified version of said targeted product, wherein said multiple virtual images represent an augmented reality based series of images that predict a progression of physical change and an operational functionality and performance condition change over time of said targeted product resulting from a usage pattern of the user and exposure to environmental conditions; and presenting, by said processor to said user via a virtual user interface of said augmented reality hardware device, a visual animation comprising said multiple virtual images of said targeted product.

11. The computer program product of claim 10, wherein generating said multiple virtual images of said targeted product comprises:

determining, based on analysis of said current data, a current state of said targeted product;

determining, based on user input, an environment that said targeted product will be deployed in for a specified period of time; and generating a prediction associated with changes for said targeted product in response to exposure to said environment for said period of time.

12. The computer program product of claim 10, wherein said method further comprises:

generating, by said processor based on said current data and said historical data, predicted conditions for specified components of said targeted product;

generating, by said processor based on said predicted conditions for specified components, multiple virtual images of said specified components, wherein said multiple virtual images of said specified components represent an augmented reality based series of images that predict a progression of physical change over time of said of said specified components resulting from exposure to said environmental conditions; and presenting, by said processor to said user via said virtual user interface of said augmented reality hardware device, said multiple virtual images of said specified components.

13. The computer program product of claim 10, wherein said generating said predicted conditions for said targeted product comprises:

generating, a profile of users providing review and feedback with respect to said targeted product and associated sub-components;

analyzing, said profile; and ranking based on results of said analyzing said profile, a credibility of said users.

14. The computer program product of claim 10, wherein said method further comprises:

generating, by said processor, inflection points for said targeted product and associated sub-components with respect to differing manufacturers of said targeted product; and generating, by said processor based on results of said generating said inflection points, a digital simulation of said targeted product with respect to personalized usage and time metrics; and generating, by said processor based on said digital simulation, a summary for said user for product selection, wherein said multiple virtual images of said targeted product are generated based on said digital simulation of said targeted product.

15. The computer program product of claim 10, wherein said current data comprises feedback, from said user, with respect to said targeted product.

16. The computer program product of claim 15, wherein said feedback comprises feedback data selected from the group consisting of manual ratings for said targeted product, text reviews for said targeted product, and edited animations for said targeted product.

17. The computer program product of claim 15, wherein said method further comprises:

converting, by said processor executing a tone analyzer apparatus, said feedback into a plurality of numbers representing said feedback.

18. An augmented reality hardware device comprising:

a processor coupled to a computer-readable memory unit, said memory unit comprising instructions that when executed by the processor causes said processor to:

receive, from a user, permission to generate product simulations for a targeted product requested by said user;

retrieve, via physical sensors and a video retrieval device, in response to receiving said permission, current data describing a current version of said targeted product;

retrieve, in response to said receiving said permission, historical data describing multiple previous versions of said targeted product;

generate, based on said current data and said historical data, predicted conditions for said targeted product;

generate, by said processor based on said predicted conditions for said targeted product, multiple virtual images of a visually aged and modified version of said targeted product, wherein said multiple virtual images represent an augmented reality based series of images that predict a progression of physical change and an operational functionality and performance condition change over time of said targeted product resulting from a usage pattern of the user and exposure to environmental conditions; and present, to said user via a virtual user interface of said augmented reality hardware device, a visual animation comprising said multiple virtual images of said targeted product.

19. The augmented reality hardware device of claim 18, wherein generating said multiple virtual images of said targeted product enables said instructions executed by the processor to further cause said processor to:

determine, based on analysis of said current data, a current state of said targeted product;

determine, based on user input, an environment that said targeted product will be deployed in for a specified period of time; and generate a prediction associated with changes for said targeted product in response to exposure to said environment for said period of time.

20. The augmented reality hardware device of claim 18, wherein said instructions executed by the processor further cause said processor to:

generate, by said processor based on said current data and said historical data, predicted conditions for specified components of said targeted product;

generate, by said processor based on said predicted conditions for specified components, multiple virtual images of said specified components, wherein said multiple virtual images of said specified components represent an augmented reality based series of images that predict a progression of physical change over time of said of said specified components resulting from exposure to said environmental conditions; and present, to said user via said virtual user interface of said augmented reality hardware device, said multiple virtual images of said specified components.

* * * * *